United States Patent Office 2,871,227
Patented Jan. 27, 1959

2,871,227

ELASTOMERIC CONDENSATION PRODUCTS PREPARED FROM POLYETHER GLYCOLS

Henry C. Walter, Wilmington, Del., assignor to E. I. du Pont de Nemours and Company, Wilmington, Del., a corporation of Delaware No Drawing. Application March 24, 1955
Serial No. 496,607

8 Claims. (Cl. 260—77.5)

This invention relates to a process for the preparation of elastomeric condensation products and more particularly to a process for the preparation of elastomeric condensation products with improved properties from the reaction between polyether glycols, an organic diisocyanate and a chain-extending agent.

In the manufacture of elastomeric condensation products by the reaction of polyalkyleneether glycols with a molar excess of an organic diisocyanate followed by chain extension with a compound having two active hydrogen atoms, urethane groups, —NHCO—O—, and urea groups, —NHCONH—, or equivalent are formed by reaction of the isocyanate groups with groups containing active hydrogen. The urethane groups are formed when an isocyanate group reacts with an alcoholic hydroxyl group, and the urea groups are formed when an isocyanate group reacts with water, amines or amides. The polymeric products formed are most frequently cured by mixing with a compound containing at least two isocyanate groups and then heating. Evidence leads to the belief that the hydrogen atom on a nitrogen in a urea group reacts quite readily with an isocyanate group while that on a nitrogen in a urethane group reacts with an isocyanate group only sluggishly if at all under the usual conditions of curing. Consequently, the relative positions of the urea groups in the molecule become quite important since they are believed to be the points of union between the polymer and the curing agent. In the processes hitherto described for the preparation of elastomeric condensation products, the arrangement of urea groups has been at random and no way of providing an ordered arrangement has been suggested.

This invention has as an object to provide a process for the preparation of elastomeric condensation products with improved properties from the reaction between polyether glycols, an organic diisocyanate and a chain-extending compound. A further object is to provide a process for the preparation of elastomeric condensation products containing an ordered relationship between structural units so as to yield an elastomer with improved properties. Other objects will appear hereinafter.

These and other objects of the invention are accomplished by the process of preparing an elastomeric condensation product from a polyether glycol, an organic diisocyanate and a chain-extending compound which comprises reacting a polyether glycol, having a molecular weight of about 750 to 2,500, with an organic diisocyanate in a molar ratio of greater than 1:1 and not more than 2:1, the resulting polyurethane having a molecular weight of not greater than about 5,000 and being characterized by having terminal hydroxyl groups; adjusting the water content of the said polyurethane product to about 0.05 to 0.35 mol of water per mol of polyurethane product; reacting said polyurethane/water mixture with an organic diisocyanate, said diisocyanate being in excess over the theory required for reaction with said polyurethane/water mixture, the resulting polymer being characterized by having terminal isocyanate groups; reacting said isocyanate-terminated polymer with a chain-extending agent having no more than two atoms bearing available active hydrogen atoms.

The process of the present invention may be carried out in customary batch equipment or it may be carried out continuously. The formation of the polyether glycol polyurethane may be carried out in conventional chemical vessels, such as agitated kettles, since the viscosity of the resulting product is usually not too great for such handling. The reaction of the polyurethane glycol/water mixture with an excess over theory of organic diisocyanate yields a somewhat more viscous product which, at least in the lower molecular weight range, is still reasonably fluid. The chain extension step, however, produces a rubbery, high molecular weight material which must be handled in heavy-duty machinery such as Werner-Pfleiderer or Banbury type mixers or in specially designed equipment.

The term "polyether glycol" as used throughout the present specification and claims refers to polyethers which may be derived from alkylene oxides or glycols, or from heterocyclic ethers, such as dioxolane, and which may be represented by the formula: $HO(RO)_nH$, in which R stands for an alkylene radical such as methylene, ethylene, propylene, etc., and $n$ is an integer greater than 1. In the polyethers useful in the present invention $n$ is sufficiently large so that the polyether glycol has a molecular weight of at least 750. It is to be understood that not all of the alkylene radicals present need be the same and that the alkylene radicals may be straight or branched chain. It is also to be understood that the term "polyether glycols" encompasses the use of polyalkyleneether-thioether glycols, as more particularly disclosed in co-pending application of Stilmar, Serial No. 423,215, filed April 14, 1954, now abandoned and the polyalkylene-arylene-ethers, as more particularly disclosed in copending application of Benning et al., Serial No. 485,288, filed January 31, 1955. For purposes of the present invention, the preferred polyether glycol is polytetramethyleneether glycol.

The molecular weight of the polyether glycol used should range from about 750 to about 2,500. Molecular weights below about 750 do not furnish a sufficiently large molecule with recurring ether groups to confer the improved properties on the elastomer due to their presence, while molecular weights above 2,500 give polyurethanes having too great a distance between urea nitrogen locations to give cured elastomers with the more desirable properties. Molecular weights of about 800 to 1,200 are preferred.

Any of a wide variety of organic diisocyanates may be employed in the reaction, including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. In general, they react more rapidly with the polyalkyleneether glycols than do the alkylene diisocyanates. Compounds such as 2,4-tolylene diisocyanate in which the two isocyanate groups differ in reactivity are particularly desirable. It is to be understood that the organic diisocyanate used to form the polyurethane glycol need not necessarily be the same as the organic diisocyanate which is reacted with the polyurethane glycol/water mixture in the process of the present invention.

The chain-extending agent which is used in the process of the present invention is a compound having no more than two atoms bearing available active hydrogen atoms. The term "active hydrogen atoms" refers to hydrogens which, because of their position in the molecule, display activity according to the Zerewitinoff test as described by Kohler in J. Am. Chem. Soc. 49, 3181 (1927). Since the process of the present invention is directed to the control of the space relations between the urethane nitrogens and the urea nitrogens, it is desirable to use only those chain extenders which yield at least one urea or amide nitrogen on reaction with an isocyanate group. Typical of the many compounds which are useful in this connection are water, carboxy acids, amines and amides, more particularly, adipic acid, terephthalic acid, adipamide, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, ethylenediamine, succinic acid, succinamide, 1,4-butanedisulfonamide, 2,4-tolylenediamine, bis(4-aminophenyl)methane, and 1,2-ethanedisulfonic acid. It is to be understood that when water, a carboxylic acid or a sulfonic acid is used as the chain extender, carbon dioxide is evolved during the reaction. This must be removed from the reaction product by mechanically working the polymer in a Werner-Pfleiderer mixer or on a rubber roll mill unless a porous product is desired.

In the formation of the elastomeric products by the process of the present invention, the polyether glycol is reacted with an organic diisocyanate in a molar ratio of greater than 1:1 and not more than 2:1. For purposes of the present invention, a molar ratio of polyether glycol to organic diisocyanate of 3:2 is preferred. The resulting product will be a polyurethane glycol with the general average structure

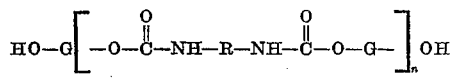

wherein R is the organic radical remaining when the two isocyanate groups are removed from an organic diisocyanate, G is the radical remaining when the two hydroxyl groups are removed from a polyether glycol, and $n$ is an integer, the value of which is set so as to yield a polyurethane glycol with a molecular weight of not greater than about 5,000. The water content of this polyurethane glycol is then adjusted to about 0.05 to 0.35 mol of water per mol of polyurethane glycol. In general, a polyurethane glycol contains about 0.05 mol of water due to the rigorous drying conditions which would be required to remove less than this quantity. For purposes of the present invention, it has been found that with greater than 0.35 mol of water present at this stage, excessive amounts of urea are introduced into the polymer, which tend to create products which, while elastomeric, are harder than desired. This polyurethane glycol/water mixture is then reacted with an excess of organic diisocyanate over the amount theoretically required to react with the said mixture. The theoretical amount may be easily calculated since each hydroxyl group requires one isocyanate group to react and each water molecule requires two isocyanate groups for complete reaction. Since an excess over the theoretically required amount of organic diisocyanate is used, the resulting polyurethane is characterized by terminal isocyanate groups. The isocyanate-terminated polymer is then reacted with a chain-extending agent and a rubbery, high molecular weight material with improved properties is produced.

It is to be understood that the process of the present invention is not limited to any particular reaction conditions since temperatures ranging from 50° to 150° C. and times of from about 20 minutes to 8 hours may be used. The polyurethane glycol may be prepared in from 1 to 3 hours at temperatures of about 90° to 120° C.; the isocyanate-terminated polymers may be prepared in from 1 to 4 hours at temperatures of from about 60° to 90° C. and the chain-extension step may be carried out at 75° to 120° C. in from about 20 minutes to 3 hours.

After the chain-extension step in the process of the present invention, it is desirable to stabilize the resulting elastomeric condensation product in order to avoid premature curing. This stabilization may be brought about by using a nitrogen containing compound such as piperidine, ammonia, etc. This stabilized polymer may then be stored for a period of several months until it is to be used, at which time it can be converted to the final elastomeric product by incorporating therewith an organic compound containing at least two isocyanate groups.

The total amount of organic diisocyanate which is added to the polyurethane glycol/water mixture is optional so long as an excess over the amount theoretically required for the reaction is used so as to yield an isocyanate-terminated polymer. The minimum amount, from a practical standpoint, is about 1.1 equivalent organic diisocyanate per equivalent of active hydrogen on the polyurethane glycol/water mixture. The maximum amount should not exceed a 500 to 600% excess over the amount theoretically required since any excess above this will unnecessarily raise the cost of the resulting elastomer. For purposes of the present invention, a preferred excess is about 1.5 to 2.5 equivalents of organic diisocyanate per equivalent of active hydrogen in the polyurethane glycol/water mixture.

The excess above theory of organic diisocyanate which is added to the polyurethane glycol/water mixture may be added in two separate portions so as to permit variation of the length of polyurethane chain which is to be ultimately chain extended. This feature of adding the organic diisocyanate in two separate portions is the subject of co-pending U. S. application, Serial No. 496,605, of McShane, of even date herewith.

The following examples will better illustrate the nature of the present invention; however, the invention is not intended to be limited to these examples. Parts are by weight unless otherwise indicated.

EXAMPLE 1

3000 parts of a polytetramethyleneether glycol of average molecular weight 935 and 373 parts of 2,4-tolylene diisocyanate are stirred for 3 hours at 100–105° C. to form a polyurethane. To 200 parts of the polyurethane is added 0.365 part of water and the mass is mixed in a Werner-Pfleiderer mixer while being heated to 70° C. Then 23 parts of 2,4-tolylene diisocyanate is added and mixing is continued for 2 hours at 70–75° C. Then 7.93 parts of water is added and mixing is continued a further 19 minutes, at which time the temperature has reached 98° C. The rubbery mass is removed from the mixer to a rubber roll mill where 0.21 part of piperidine per 100 parts of polymer is milled in.

100 parts of this stabilized polymer is mixed with 4 parts of N,N'-bis(3-isocyanato-4-methylphenyl)urea on a rubber mill. The compounded mass is put in a mold in a press and cured at 134° C. for 20 minutes. The rubbery slabs obtained show the following properties:

Tensile strength at the break _____ lbs./sq. in __ 4450
Modulus at 300% elongation _____ lbs./sq. in __ 575
Elongation at the break _____ percent __ 710

EXAMPLE 2

950 parts of polytetramethyleneether glycol of average molucular weight 960 and 116 parts of 2,4-tolylene diisocyanate are stirred together at 100–105° C. for 3 hours.

The viscous liquid is a polyurethane glycol containing on the average three polyetherglycol moieties joined by two diisocyanate moieties.

The apparatus used for preparing the elastomer from this polyurethane consists of: a feed tank for the polyurethane and a feed tank for 2,4-tolylene diisocyanate; positive displacement pumps for feeding these materials to the reaction vessels; 4 agitated vessels, each of about 1000 cc. holdup capacity, arranged in a cascade relation so that the first overflowed into the second by gravity; a positive displacement pump for feeding the overflow from the fourth vessel to a mixer where water is metered in; the mixer is a centrifugal pump and the "prepolymer" and water are forced in thru the normal exit and discharged thru the normal entrance; the mixture from the pump falls onto a continuous belt bearing a sheet of polyethylene about 12 inches wide and 5 feet long and which is enclosed so that atmosphere of 100% relative humidity may be maintained by bleeding in steam and the temperature maintained at 70-75° C.; the firm porous belt of product emerging from this "chain-extending" unit falls onto another continuous belt which is enclosed for most of its length so that an atmosphere containing ammonia may be maintained; this "stabilizer" unit discharges to a container and ends the continuous part of the process.

The polyurethane is fed to the first reaction vessel at a rate of 3600 g. per hour while 2,4-tolylene diisocyanate is simultaneously fed in at a rate of 496 g. per hour. The temperature in each of the vessels is held at 78–82° C. by controlled heating.

The overflow from the fourth reaction vessel is pumped to the reverse-pump-mixer simultaneously with water which is fed at a rate of 225 g. per hour. The two components are very thoroughly mixed in the mixer and discharged as a frothy mass onto the moving belt. Here the mass foams and slowly sets to a rubbery sponge as it is moved thru the enclosure. The temperature is maintained at 70–75° C. The belt travels about 2 inches per minute so that the average residence time is about 25 minutes. The chemical reaction involved here is a reaction between water and the isocyanate-terminated polymer. Carbon dioxide is evolved which causes the frothing and sponge formation. The use of an atmosphere saturated with water vapor is desirable to prevent water evaporation from the surface of the polymer which would result in uneven reaction.

As the mass emerges from the enclosure, it is only slightly tacky. The polythene sheet is stripped off and the spongy strip falls onto another endless belt and is carried thru the "stabilizer" enclosure where it is exposed to an atmosphere which is approximately 50% $NH_3$. The residence time averages 15 minutes. The product emerges unchanged in physical appearance but it no longer has any free —NCO groups.

A portion of the polymer is milled to a smooth sheet on a rubber mill. It has a Mooney viscosity (small rotor) at 100° C. of 94 at 4 minutes and 84 at 10 minutes.

A portion of the polymer is milled on a rubber mill at 100–105° C. for 10 minutes and sheeted off as a smooth sheet. 100 parts of this is then milled with 4 parts of N,N'-bis(3-isocyanato-4-methylphenyl)urea and placed in a mold in a press and cured at 134° C. for 15 minutes. The snappy elastomer which is obtained shows the following properties:

|  | 25° C. | 70° C. |
|---|---|---|
| Tensile strength at the break, lbs./sq. in | 3,500 | 2,200 |
| Modulus at 300% elongation, lbs./sq. in | 700 | 600 |
| Elongation at the break, percent | 550 | 900 |

EXAMPLE 3

A mixture of 1200 g. of polytetramethyleneether glycol of average molecular weight 947 and 150 g. of 2,4-tolylene diisocyanate is heated for 3 hours at 100° C. to form a polyurethane glycol. 1296 grams of the polyurethane glycol and 1.86 g. of water are stirred together at 70° C. for 15 minutes under an atmosphere of nitrogen and then 115 g. of 2,4-tolylene diisocyanate is added. Stirring under an atmosphere of nitrogen is continued for 3 hours at 70° C. This isocyanate-terminated polymer is placed in a one-gallon Werner-Pfleiderer mixer which is equipped with dispersion-type blades, and 60 g. of water is added. A nitrogen atmosphere is maintained in the mixer. Mixing is carried on for 30 minutes at 8 R. P. M., the temperature being held at 70° C. The agitation is stopped and the mass allowed to stand for 2 hours. The rubbery polymer is then removed from the mixer, transferred to a rubber roll mill, and 1 g. of piperidine is milled in to stabilize it.

EXAMPLES 4–9

These examples are made by the process of Example 3, substituting the following materials and weights:

| Ex. No. | First Step | | | Second Step | | | Third Step |
|---|---|---|---|---|---|---|---|
|  | Polytetramethylene Ether Glycol | | 2,4-Tolylene Diisocyanate, Wt. Gr. | Polyurethane Glycol, Wt. Gr. | Water, Wt. Gr. | 2,4-Tolylene Diisocyanate, Wt. Gr. | Water, Wt. Gr. |
|  | Mol. Wt. | Wt. Gr. |  |  |  |  |  |
| 4 | 947 | 552 | 79.5 | 594 | 0.58 | 44.6 | 16.2 |
| 5 | 947 | 552 | 79.5 | 582 | 0.57 | 41.7 | 15.9 |
| 6 | 947 | 552 | 79.5 | 577 | 0.56 | 34.9 | 15.8 |
| 7 | 920 | 552 | 52.1 | 580 | 2.1 | 75.2 | 36.2 |
| 8 | 920 | 552 | 52.1 | 585 | 2.1 | 96.5 | 36.7 |
| 9 | 947 | 1,200 | 150 | 1,309 | 0.38 | 116.3 | 60.0 |

The variation in properties can be shown by a comparison of several of the above examples. In the figures that follow, the molecular weight of the polyurethane glycol is taken as that calculated from the molar quantities combined. The ratio urea/urethane is calculated on the basis that all of the hydroxyl groups of the polytetramethyleneether glycol react with the —NCO groups of 2,4-tolylene diisocyanate to form urethane linkages and all the remainder of the —NCO groups react with water to form urea groups.

The stabilized polymers of Examples 3 and 9 are compared by the Williams plasticity measurement. The test has the A. S. T. M. designation D 926–47 T and is also described by Williams in Industrial and Engineering Chemistry 16, 362 (1924). The temperature of the test is 120° C. and the time for the plasticity measurement is 3 minutes and for the recovery measurement is 1 minute.

| Ex. | Mols $H_2O$ per Mol Polyurethane Glycol, 2nd Step | Mols 2,4-Tolylene Diisocyanate per Mol Polyurethane Glycol, 2nd Step | Ratio of Nos. of Urea/Urethane Groups | Williams Plasticity | Recovery |
|---|---|---|---|---|---|
| 3 | 0.25 | 1.63 | 0.12 | 113 | 19 |
| 9 | 0.05 | 1.63 | 0.12 | 62 | 1 |

The results indicate that the elastomer from Example 3 has more "nerve" and is more difficult to mill than that from Example 9. This is due to the different amount of water incorporated in the 2nd step which alters the positions of the urea groups in the molecule.

Portions of Examples 4 to 8 are cured by milling 100 parts with 8 parts of N,N'-bis-(3-isocyanato-4-methylphenyl)urea on a rubber mill, placing in a mold in a press and heating for 15 minutes at 134° C. The cured samples are tested for low temperature resistance by the T–50 test.

The T-50 value is a measure of the resistance of the elastomer to low temperatures. A sample is elongated to 270% of its length, put into hexane at −60° C. for 5 minutes, releasing the elongating means, raising the temperature of the bath 1° C. per minute and observing the retraction of the sample. The T-50 value is the temperature at which the sample has retracted to one-half of the 270% elongation. This test is based on the A. S. T. M. T-50 test designated D-599-40 T.

The results are shown in the following table:

| Ex. | Ratio of Nos. urea/urethane Groups | Mols 2,4-Tolylene Diisocyanate per Mol Polyurethane | Mols Polytetramethylene Ether Glycol per Mol 2,4-Tolylene Diisocyanate in Polyurethane | T-50 Value, °C. |
|---|---|---|---|---|
| 4 | 0.133 | 2.14 | 1.27 | −4 |
| 5 | 0.124 | 2.24 | 1.27 | −5 |
| 6 | 0.089 | 1.89 | 1.27 | −5 |
| 7 | 0.125 | 1.50 | 2.0 | −9 |
| 8 | 0.228 | 1.91 | 2.0 | −18 |

Comparing Examples 5 and 7, it will be seen that increasing the ratio of mols of polytetramethyleneether glycol to 2,4-tolylene diisocyanate in the polyurethane glycol lowers the T-50 value. This change in ratio causes a decrease in molecular weight from 5426 in Example 5 to 2014 in Example 7. Examples 6 and 8 exhibit a similar phenomenon. It is further to be noted that in Examples 5 and 7 the ratio of urea to urethane groups remains constant while the mols of 2,4-tolylene diisocyanate per mol of polyurethane varies. In Examples 6 and 8 the reverse is true. It is evident that the manipulation of materials made possible by using the process of the present invention permits a wide variation in the average structure of the resulting polymer.

EXAMPLES 10-13

A series of examples is run in which the molecular weight of the polyurethane is varied. The polyurethane is prepared as in the previous examples by stirring the appropriate quantities of 2,4-tolylene diisocyanate and polytetramethyleneether glycol of molecular weight 960 at 100±2° C. for 3 hours under an atmosphere of nitrogen.

The appropriate amount of polyurethane is then placed in a Werner-Pfleiderer mixer, the required amount of water is added, mixing continued at 80° C. for 30 minutes, the required amount of 2,4-tolylene diisocyanate is added and mixing continued for 2.5 hours at 72-78° C. Then the chain extension water is added and mixing continued, the jacket temperature being kept at 80° C. When rubbery chunks form and ride on top of the mixer blades, the polymer is put on a rubber mill and stabilized by the addition of about 0.5-0.9 parts of piperidine per 100 parts of polymer. The polymer is then sheeted off the rubber mill. The quantities are shown in the following table. It should be noted that in these examples the only variable is the molar ratio of polytetramethyleneether glycol to 2,4-tolylene diisocyanate, the other molar ratios remaining constant.

| Ex. No. | First Step | | |
|---|---|---|---|
| | Polytetramethylene ether Glycol | 2,4-Tolylene Diisocyanate, Parts | Molar ratio of Glycol to Diisocyanate |
| | Parts | Mol. Wt. | | |
| 10 | 1,388 | 945 | 134.5 | 2/1 |
| 11 | 1,344 | 960 | 165 | 3/2 |
| 12 | 1,344 | 960 | 185.2 | 4/3 |
| 13 | 1,344 | 960 | 197.3 | 5/4 |

| Ex. No. | Second Step | | | | | |
|---|---|---|---|---|---|---|
| | Polyurethane | | Water | | 2,4-Tolylene Diisocyanate | |
| | Parts | Mol. Wt. | Parts | Mol/Mols Polyurethane | Parts | Mol/Mols Polyurethane |
| 10 | 1,243.8 | 2,073 | 3.46 | 0.32 | 240 | 2.3 |
| 11 | 1,325 | 3,232 | 2.36 | 0.32 | 164 | 2.3 |
| 11 | 1,310 | 4,368 | 1.73 | 0.32 | 120 | 2.3 |
| 13 | 1,321 | 5,503 | 1.38 | 0.32 | 96 | 2.3 |

| Ex. No. | Third Step | |
|---|---|---|
| | Water | |
| | Parts | Mol/Mols Polyurethane |
| 10 | 75.6 | 7.0 |
| 11 | 51.7 | 7.0 |
| 12 | 37.8 | 7.0 |
| 13 | 30.2 | 7.0 |

The Mooney viscosity is determined on the stabilized polymer according to A. S. T. M. method D-1077-49-T in "ASTM Standard on Rubber Products," May 1951. In the tests the small rotor is used at 100° C.

Portions of each are compounded with 4 parts of N,N'-bis(3-isocyanato-4-methylphenyl)urea per 100 parts of polymer and cured in molds in a press for 15 minutes at 134° C. The samples are tested for cold resistance by the T-50 test described previously and the modulus at 300% elongation is determined after 14 days storage. Results are shown below:

| Ex. No. | Glycol/Diisocyanate Ratio in Polyurethane | Mooney Viscosity at 4 min. | Modulus of cured Elastometer at 300% Elongation after 14 days, Lbs./sq. in. | T-50 Value, °C. |
|---|---|---|---|---|
| 10 | 2/1 | 77 | 1,000 | −20 |
| 11 | 3/2 | 61 | 750 | −20 |
| 12 | 4/3 | 53 | 540 | −14 |
| 13 | 5/4 | 41 | 400 | −6 |

The change in properties with increasing molecular weight of polyurethane is very clearly shown here. This increase is interpreted as lengthening the distance between urea groups in the polymer which are believed to be the cross-linking sites for curing.

EXAMPLE 14

A.—PREPARATION OF POLYETHER-THIOETHER GLYCOL

A mixture of 549 parts of thiodiglycol and 405 parts of 1,4-butanediol (equimolar ratio) along with 198 parts of benzene and 13.5 parts of p-toluene sulfonic acid is heated in a vessel equipped with a reflux condenser and a trap for separating the water distilled with the benzene. The mixture is heated at reflux for 83 hours during which time the temperature gradually rises from 87° C. to 112° C. and 126 parts of water is removed. Heating is then continued an additional 5 hours, benzene being removed periodically until a total of 88 parts is removed. Then 82.3 parts of thiodiglycol is added and heating is continued an additional 1.2 hours. The total water removed is 162 parts.

To the cooled reaction mixture is added 38 parts of sodium carbonate dissolved in 340 parts of water and the mixture boiled under reflux to neutralize the acid catalyst. The mass is cooled. Approximately 600 parts of benzene is added, the mass stirred and the lower aqueous layer allowed to separate after which it is withdrawn.

The upper benzene layer is washed first with 500 parts of hot water containing 2% HCl and then four times with 500-part portions of hot water.

The crude polyether-thioether glycol is recovered by steam-stripping off the benzene and water. It is purified by dissolving in 440 parts of benzene, boiling for 10 minutes with 10 parts of "Darco" KB activated charcoal, and filtered. The benzene is distilled off first at atmospheric pressure and finally at 0.6–0.7 mm. of mercury pressure at 140–150° C. The yield is 685 parts of a light yelolw, viscous oil with the following properties:

| | |
|---|---|
| Hydroxyl No | 100.6 |
| Ester No | Nil |
| Acid No | 0.19 |
| Sulfur_____percent | 20.2 |
| Water_____do | 0.037 |
| Mol. wt. (by OH no.) | 1115 |

B.—PREPARATION OF ELASTOMER

A mixture of 100.4 parts of the polyether-thioether glycol prepared in "A" above and 10.84 parts of 2,4-tolylene diisocyanate is heated together for 3 hours at 100° C. under an atmosphere of nitrogen. The 1 part of phenyl-β-naphthylamine is added, the temperature lowered to 60° C. and heating continued for 16 hours. To this polyurethane is added 9.9 parts of 2,4-tolylene diisocyanate and stirring at 60° C. is continued for 22 hours.

108.7 parts of the isocyanate-terminated polymer thus formed is dissolved in about 450 parts of dry tetrahydrofuran and the 4.6 parts of water is thoroughly stirred in. The mixture is allowed to stand at room temperature for a week. Analysis for —NCO shows nil. The solvent is evaporated, finally, at 80° C. in a vacuum oven. 104 parts of a rubbery polymer are obtained.

100 parts of the polymer is milled on a rubber mill at 100° C. for 10 minutes to insure dryness, then 15 parts of carbon black is milled in and then 10 parts of N,N'-bis(3-isocyanato-4-methylphenyl)urea is added. The temperature of the mill rolls is reduced to 80° C. and milling continued for about 10 minutes.

Portions of the compounded mass are put in molds and cured by heating in a press at 134° C. for 30 minutes. The vulcanizate shows the following properties:

| | 25° C. | 70° C. |
|---|---|---|
| Tensile strength at the break, lbs./sq. in | 3,300 | 1,850 |
| Modulus at 300% elongation, lbs./sq. in | 1,300 | 900 |
| Elongation at the break, percent | 590 | 590 |
| T-50 value, −36.5° C. | | |
| Does not freeze in 7 days at −20° C. | | |

EXAMPLES 15–18

Elastomers are prepared according to the general procedure of Example 1 using a variety of diisocyanates in the preparation of the polyurethane glycol and using 2,4-tolylene diisocyanate for reaction with the polyurethane/water mixture. These polymers are cured similarly and the properties of the elastomers obtained. In all examples the molecular weight of the polytetramethylene ether glycol is 1000 and the first reaction requires 3 mols of the polytetramethylene ether glycol and 2 mols of the diisocyanate which are heated together at 100° C. for 3 hours. Then 0.32 mol of water is added followed by 2.3 mols of 2,4-tolylene diisocyanate. This is followed by the use of 7.0 mols of water for chain extension which requires 18–21 minutes. The polymers are stabilized by milling on a rubber mill with 0.6–0.9 parts of piperidine per 100 parts of elastomer.

The cures are effected by milling 8 parts of 1,3-bis(3-isocyanato-4-methylphenyl)urea into 100 parts of the polymer and heating in a mold in a press at 134° C. for 15 minutes. The vulcanizates are then aged 14 days at 50% relative humidity.

Typical properties of the vulcanizates so prepared are given in the following table.

| Ex. No. | Diisocyanate | Tensile Strength at break, lbs./sq. in. | | Modulus at 25° C., 300% Elongation, lbs./sq. in. | Elongation at 25° C., at break, percent | Hardness, Shore | T-50, ° C. |
|---|---|---|---|---|---|---|---|
| | | 25° C. | 70° C. | | | | |
| 15 | 3,3'-dimethyl-4,4'-biphenyl-diisocyanate. | 4,050 | 2,000 | 600 | 540 | 64 | −5 |
| 16 | 4,4'-methylene diphenyl isocyanate. | 3,850 | 3,550 | 1,200 | 440 | 73 | −17 |
| 17 | 4-isopropyl-m-phenylene diisocyanate. | 2,950 | 2,500 | 950 | 480 | 73 | −21 |
| 18 | 3,3'-dimethoxy-4,4'-biphenyl-diisocyanate. | 4,700 | 3,850 | 1,250 | 430 | 73 | −13 |

The elastomers prepared according to the process of the present invention may be employed in the preparation of tires, inner tubes, belts, hose and tubing, wire and cable jackets, footwear, sponges, coated fabrics and a wide variety of coated or molded articles.

The elastomeric properties of the products produced by the process of the present invention may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide and plasticizers. Inorganic and organic coloring agents may be incorporated to give well defined colors.

As many widely different embodiments of this invention may be made without departing from the spirit and scope thereof, it is to be understood that this invention is not limited to the specific embodiments thereof except as defined in the appended claims.

What is claimed is:

1. A process for the preparation of curable elastomeric condensation products which comprises reacting a polyether glycol having a molecular weight of about 750 to 2,500 with an organic diisocyanate in which the isocyanate groups are the sole reactive functional groups thereof in a molar ratio of greater than 1:1 and not more than 2:1, the resulting polyurethane having a molecular weight of not greater than 5,000 and being characterized by having terminal hydroxyl groups; adjusting the water content of the said polyurethane product to about 0.05 to 0.35 mol of water per mol of polyurethane product; reacting said polyurethane glycol/water mixture with an organic diisocyanate in which the isocyanate groups are the sole reactive functional groups thereof, said diisocyanate being in excess over the theoretical amount required for reaction with said polyurethane glycol/water mixture so as to produce a polymer characterized by having terminal isocyanate groups; and reacting said isocyanate-terminated polymer with a chain-extending agent having no more than two atoms bearing available active hydrogen, said chain-extending agent being selected from the group consisting of water and organic compounds containing two active hydrogen containing groups in the molecule, said active hydrogen containing groups being reactable with isocyanate groups.

2. A process according to claim 1 in which the polyether glycol is a polytetramethylene ether glycol.

3. A process according to claim 1 in which the organic diisocyanate which is reacted with the polyether glycol is 2,4-tolylene diisocyanate.

4. A process according to claim 1 in which the organic diisocyanate which is reacted with the polyurethane glycol/water mixture is 2,4-tolylene diisocyanate.

5. A process according to claim 1 in which the chain-extending agent is water.

6. A process for the preparation of curable elastomeric condensation products which comprises reacting a polytetramethylene ether glycol having a molecular weight of about 800 to 1,200 with 2,4-tolylene diisocyanate in a molar ratio of 3:2, the resulting polyurethane having a molecular weight of not greater than 5,000 and being characterized by having terminal hydroxyl groups; adjusting the water content of the said polyurethane product to about 0.05 to 0.35 mol of water per mol of polyurethane product; reacting said polyurethane glycol/water mixture with 2,4-tolylene diisocyanate, said diisocyanate being in excess over the theoretical amount required for reaction with said polyurethane glycol/water mixture so as to produce a polymer characterized by having terminal isocyanate groups; and reacting said isocyanate-terminated polymer with water.

7. The products produced according to the process of claim 1.

8. The products produced according to the process of claim 6.

References Cited in the file of this patent

UNITED STATES PATENTS

| | | |
|---|---|---|
| 2,621,166 | Schmidt et al. | Dec. 9, 1952 |
| 2,692,874 | Langerak | Oct. 26, 1954 |
| 2,702,797 | Rugg | Feb. 22, 1955 |
| 2,723,935 | Rodman | Nov. 15, 1955 |